Jan. 10, 1967   E. L. DAMAN ETAL   3,296,779
VAPOR-LIQUID SEPARATOR
Original Filed May 4, 1961   5 Sheets-Sheet 1

INVENTORS
ERNEST L. DAMAN
JOHN J. VAIL
JOHN BLIZARD
HENRY PHILLIPS
BY
Charles E. Boxley
ATTORNEY

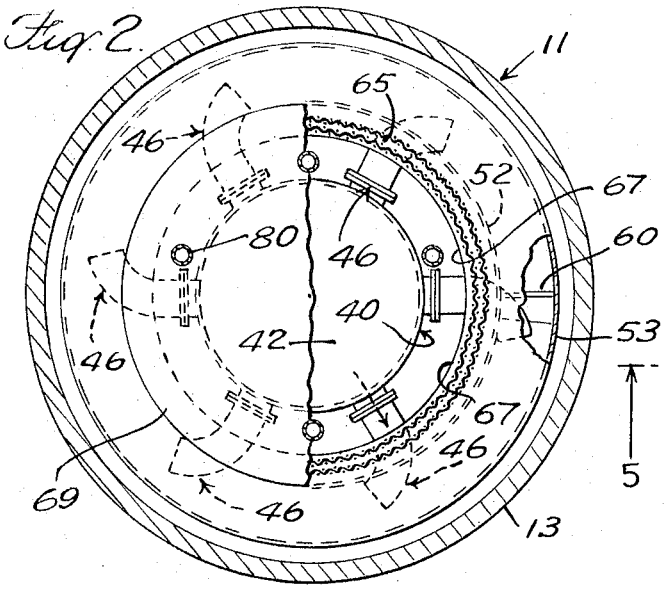
Fig. 2.
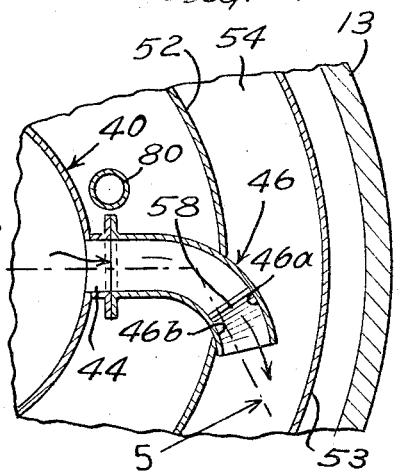
Fig. 4.
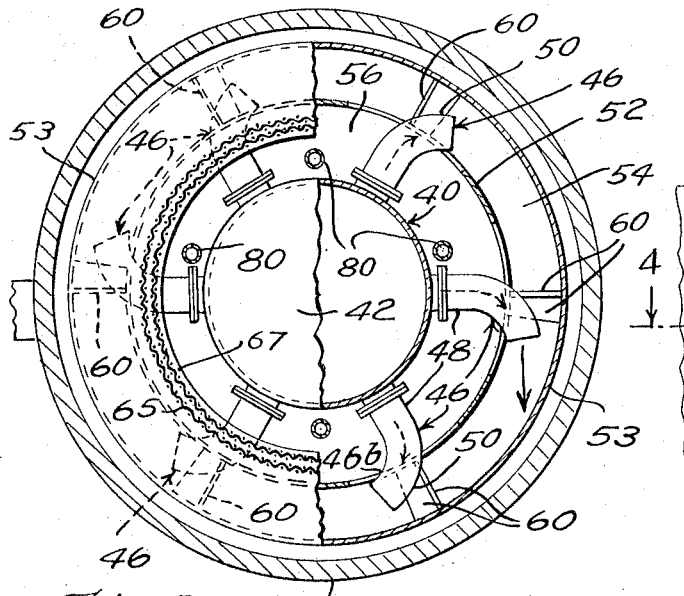
Fig. 3.
Fig. 5.
INVENTORS
ERNEST L. DAMAN
JOHN J. VAIL
JOHN BLIZARD
HENRY PHILLIPS
BY
Charles E. Boxby
ATTORNEY

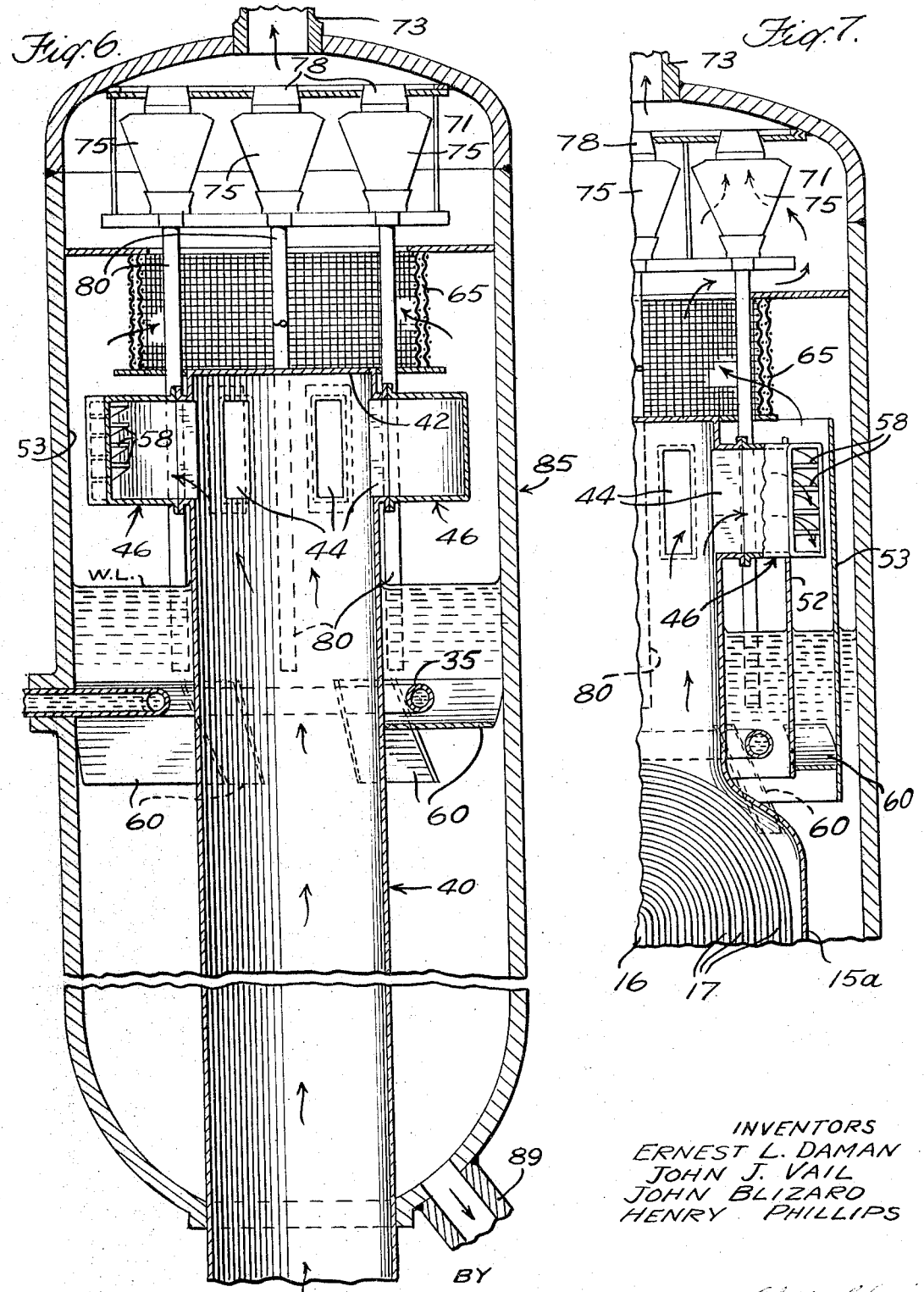

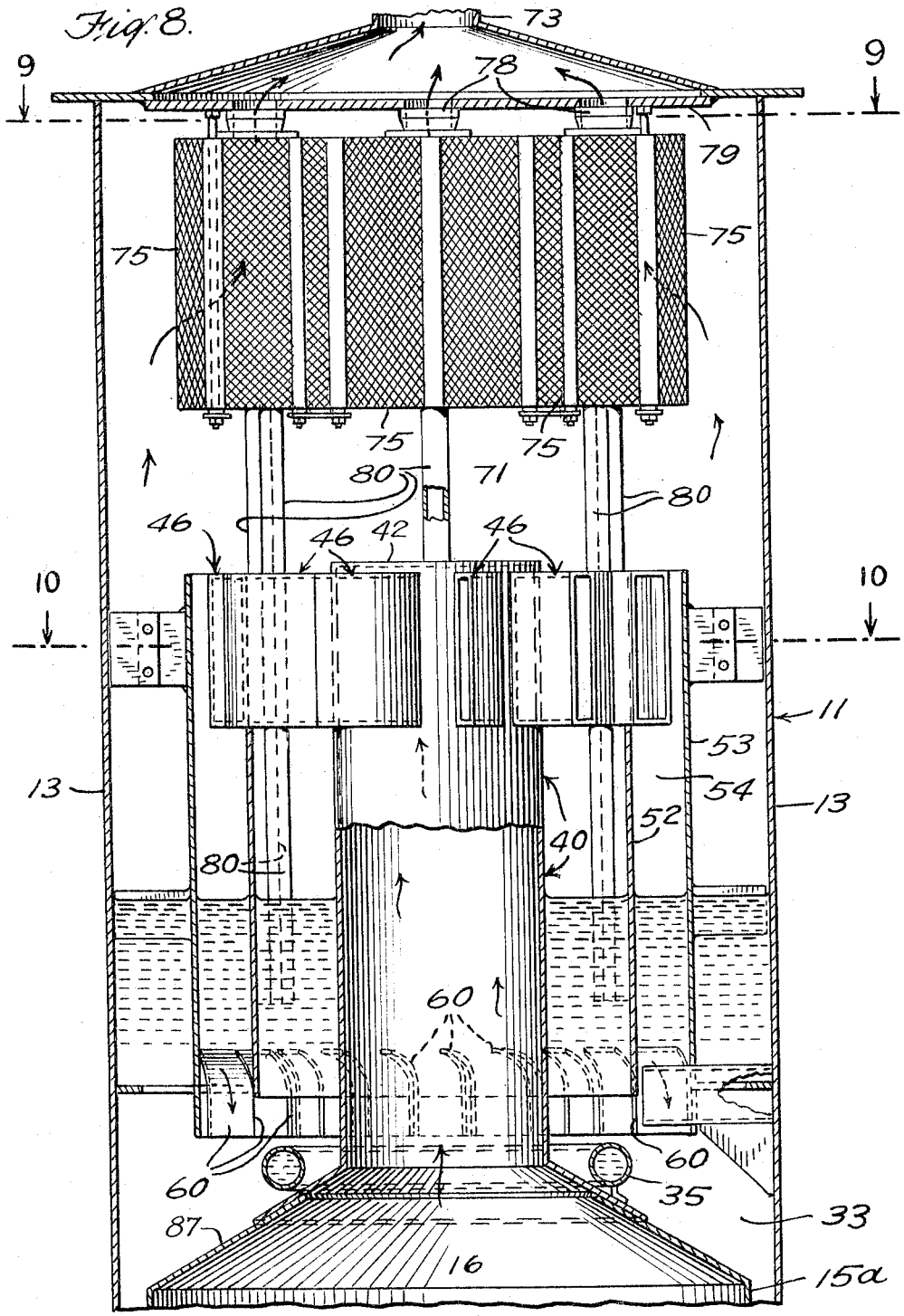

United States Patent Office 3,296,779
Patented Jan. 10, 1967

3,296,779
VAPOR-LIQUID SEPARATOR
Ernest L. Daman, Westfield, and John J. Vail, Rahway, N.J., John Blizard, Garden City, N.Y., and Henry Phillips, Metuchen, N.J., assignors, by mesne assignments, to the United States of America as represented by the United States Atomic Energy Commission
Continuation of application Ser. No. 107,698, May 4, 1961. This application Mar. 6, 1964, Ser. No. 350,066
2 Claims. (Cl. 55—337)

This application is a continuation of co-pending application Serial No. 107,698, filed May 4, 1961, and now abandoned.

This invention relates to vapor-liquid separators and more particularly to centrifugal vapor-liquid separators.

Vapor generation usually requires the use of vapor-liquid separating devices to minimize the moisture content of vapor. Centrifugal type separators usually comprise a plurality of cylindrical shells with inlets which direct a mixture of vapor and liquid tangentially onto the side walls of the shells, thereby disposing a vapor-liquid stream over a large area of wall. Because a liquid is denser than its vapor, the liquid moves outwardly and downwardly separating from the vapor for discharge from the bottoms of the shells. Vapor flows upwardly for exit.

In the past, effective centrifugal action has required a high initial vapor-liquid velocity which has conventionally been provided by means of restricted orifices at the price of a high pressure drop. Efficiency of separation has depended upon the duration of contact of the whirling streams with the shell walls, but controlling conditions inherent in vapor generator design have grudgingly allotted vapor generator height to the function of vapor-liquid separation. Therefore, the dilemma has always arisen of being compelled to compromise pressure loss and the height required for a vapor generator.

This advance teaches a novel vapor-liquid separator which expediently solves the pressure loss and space dilemma of vapor generators. More particularly, the present invention contemplates an annular wall and a centrally disposed vapor-liquid mixture collection member which defines a collecting chamber adapted to receive vapor-liquid mixture. Connected to the vapor-liquid mixture collection member are a plurality of conduits which receive vapor-liquid mixture from the collection chamber. The conduits extend in an arcuate direction terminating adjacent and substantially tangent to a wall or baffle so that vapor-liquid mixture leaving the conduits will be centrifugally accelerated. This separator may be situated either internally or externally relative to the boiler casing.

An object of this invention is an improved vapor-liquid separator.

Another object of this invention is a vapor-liquid separator requiring reduced space.

Still another object of this invention is a vapor-liquid separator having a reduced amount of pressure loss therein.

Other objects of the present invention will appear more fully from a study of the detailed description in conjunction with the accompanying drawings wherein preferred embodiments of the invention are illustrated and wherein like reference characters refer to like parts. In the drawings:

FIGURE 2 is a sectional view taken along the line 2—2 of FIGURE 1;

FIGURE 3 is a sectional view taken along the line 3—3 of FIGURE 1;

FIGURE 4 is an enlarged sectional view taken along the line 4—4 of FIGURES 1 and 5;

FIGURE 5 is a sectional view taken along the line 5—5 of FIGURE 4;

FIGURE 6 is a vertical sectional view of the vapor-liquid separating apparatus of the present invention disposed in a pressure vessel separate from the vessel containing the vapor generating elements;

FIGURE 7 is a fragmentary sectional view of a modified form of this invention;

FIGURE 8 is a vertical sectional view, partly in elevation of another embodiment of the vapor-liquid separating apparatus;

Figure 1:
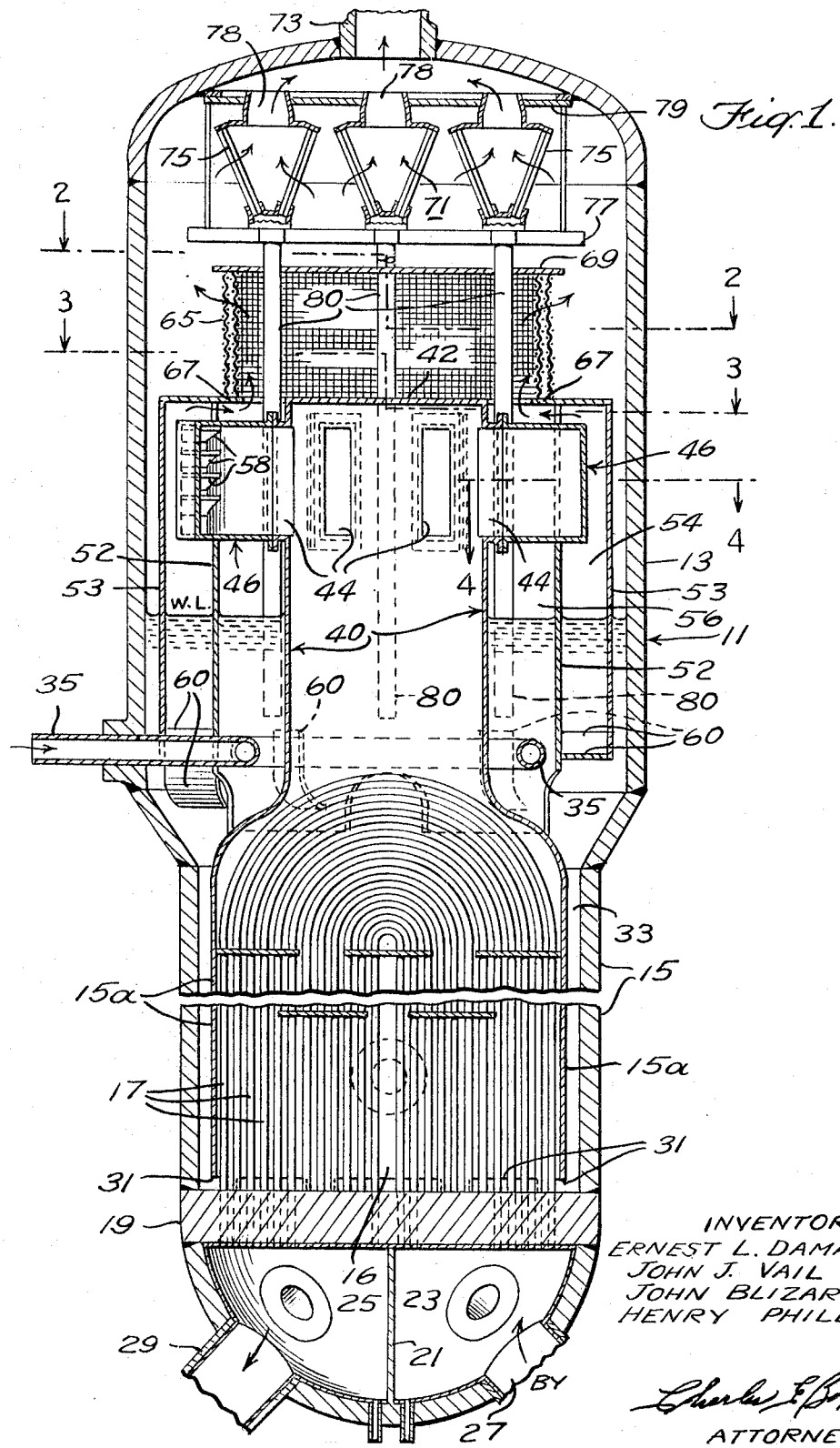
FIGURE 1 is a vertical sectional view of a vapor generator which incorporates the vapor-liquid separating apparatus of the present invention.

Referring to the drawings for a more detailed description of the present invention and, more particularly to FIGURE 1 wherein one embodiment thereof is illustrated, a vertical vapor generator, generally designated by the numeral 11, comprises a substantially cylindrical pressure vessel 13 provided with a reduced portion 15 arranged concentrically with the wall of pressure vessel 13. The interior of the reduced portion 15 defines a vapor generating chamber 16 and contains a plurality of substantially U-shaped tubes 17 which are secured at their ends to a tube sheet 19. An upright partition 21 is provided in the bottom of the reduced portion 15 and cooperates with tube sheet 19 to define a fluid inlet compartment 23 and a fluid outlet compartment 25. A conduit 27 is connected to compartment 23 to deliver a heating fluid thereto for passage through tubes 17 and an outlet conduit 29 is connected to compartment 25 for discharging the heating fluid from vessel 13. A shell 15A is filled with a liquid as for example water (in the state of ebullition), which enters the shell 15A through a plurality of openings 31 formed at the bottom of the shell and adjacent tube sheet 19. The openings 31 are in communication with an annular downcomer passage 33. A toroidial-shaped feed-water inlet conduit 35 is provided in vessel 13 and is in communication with the downcomer passage 33 to supply the latter with make-up water.

Coming now to the novel vapor-liquid separating apparatus of the present invention, a vapor-liquid collection member 40 is provided centrally of vessel 13 in the upper part thereof, and in the form shown in FIGURE 2 constitutes a reduced diameter portion of shell 15A. The top of collection member 40 has a closed end plate 42 and formed immediately below in member 40 are a plurality of rectangular shaped outlet ports or slots 44. A conduit or nozzle 46 is connected to each port 44 and has a straight portion 48 and an arcuate shaped portion 50 (FIGURES 3 and 4). Portion 48 of nozzle 46 extends normal to collection member 40 and merges in series with arcuate portion 50. Each nozzle 46 extends through a cylindrical shaped baffle 52 which is disposed in concentric relationship with the pressure vessel 13 and collection member 40. The lower edge of baffle 52 terminates above the top of reduced diameter shell portion 15. Baffle 52 cooperates with the wall or baffle 53 to define annular shaped vapor-liquid separation chamber 54. A plurality of inclined flow directing vanes 58 can be provided in the arcuate portion 50 of nozzles 46 and vortex eliminator vanes 60 are disposed in the bottom of annular chamber 54.

Considering now the operation of the structure thus far described, a liquid level W.L. results in the normal operation of vapor generator 11 and the water in vapor generating portion 16 is heated by the fluid flowing in the heating tubes 17. A steam-water mixture passes upwardly in shell 15A for collection in member 40, where the mixture then enters ports 44 for passage through nozzles 46. Since the liquid is, as has been previously stated, in the state of ebullition, the mixture flowing upward contains a majority by weight of liquid. Nozzles 46 are shaped in the manner disclosed in the drawings to produce a layer of water and a layer of steam by reason of the arcuate shape of the nozzles which effects an initial centrifuging and separation of the steam from the water. The stream of liquid assumes a position along the outside curved wall 46A (FIGURE 4) of the nozzle, while the layer of steam flows along the inner curve wall 46B of the nozzle.

It is well known that when a mixture of vapor and liquid is directed tangentially relative a wall to provide a vortex or whirling stream there along, the centrifugal force causes the heavier fluid (liquid) to flow along the wall while the lighter fluid (vapor) travels away from the wall and towards the center of the whirling stream. In effect, the steam must force its way through the wall of water along the vessel wall to enter the center of the whirling stream and, consequently, an objectionable amount of unseparated steam may be trapped in the water. With the construction of the nozzles 46 of the present invention a large portion of the steam to be separated is caused to be disengaged from the water by being directed onto baffle 53 before entering separation chamber 54, whereby the amount of steam required to separate from the water whirling along the wall means 53 is reduced. The shape of the vortex of the steam and water mixture on wall means 53 is controlled by the flow directing vanes 58 in the nozzles 46. The separated liquid flows downwardly in chamber 54 and through the vortex eliminator vanes 60, whence it enters downcomer passage 33. A continuous circulation is maintained between downcomer passage 33 and the interior of shell 15A, through openings 31 in the latter, by reason of the greater density liquid in the passage 33 as compared to that in shell 15A.

Depending upon the dryness of the steam required for a particular installation, the water-free character of the steam may be increased by causing the separated steam to pass through moisture eliminators or dryers. The novel structure of the present invention is readily adaptable for such purpose and incorporates an annular or ring-shaped eliminator 65 of conventional wire mesh or corrugated design to form part of the upper portion of chamber 54. Eliminator 65 is supported on member 67 (FIGURES 1 and 2) arranged transversely of collection member 40 and baffles 52 and 53. Disc 69 is secured to eliminator 65 and closes the top thereof. It will be understood that some water which may be carried with the upwardly flowing steam in chamber 54 is caused to be separated from the steam by reason of its change of direction, and eliminator 65 further reduces the wetness of the steam. The steam flowing through eliminator 65 enters a vapor space 71 of vessel 13 which is provided with a vapor outlet conduit 73 for discharging steam from the vessel.

Disposed in vapor space 71 are a plurality of dryers 75 of the chevron type which are supported on a drain plate 77. A conduit 78 is connected to the top of each dryer 75 and extends through a plate 79 secured at its edges to the top of vessel 13. The steam in vapor space 71 flows through the chevron structure, where additional moisture is separated from the steam and substantially dry steam flows into the space between plate 79 and the top of vessel 13 for discharge through vapor outlet conduit 73. The separated moisture or water in dryers 75 exist via drains 80.

Further details on the chevron-type dryer are shown in U.S. Patent No. 2,675,888, of J. Blizard et al.

It will be apparent from the foregoing description that the present invention provides novel structure whereby an effective separation of liquid and vapor from a vapor-liquid mixture is accomplished. It will be noted that the inlet ports or slots 44 are of large cross-sectional area as compared with inlet ports found in multiple centrifugal-type separators presently used so that the pressure drop encountered in the present invention is not as great. Furthermore, by providing for an initial angular acceleration of the vapor and liquid mixture in nozzles 46 before the same is whirled onto the wall means 53, an increase in separation efficiency is effected. In addition, the use of the relatively large surface area of the vessel wall in separation chamber 54 allows the introduction of the mixture into its whirling path at a lower velocity, and thereby lessens to a large degree the tendency of objectionable amounts of water traveling upwardly to the vapor space of the vessel.

FIGURE 6 discloses an arrangement of this vapor-liquid separating apparatus of the present invention disposed in an elongated vessel or drum 85 which is separate from an associated vapor generating portion (not shown). The structure of the vapor-liquid separating apparatus as shown in drum 85, which also serves as wall means 53 and functions substantially the same as the embodiment disclosed in FIGURES 1 to 5 and, accordingly, the reference characters used in FIGURE 6 are those which are applied to corresponding structure in FIGURES 1 to 5. In FIGURE 6 it will be noted that the vapor-liquid collection member 40 is extended to the bottom of drum 85 and is secured in fluid-tight relationship therewith. Collection member 40 has an extension portion 87 which is connected to receive a mixture of vapor and liquid from the vapor generating portion (not shown). A conduit 89 is connected to drum 85 and serves to deliver the separated liquid and make-up water to the vapor generating portion (not shown). The vapor-liquid separating apparatus in drum 85 operates in the same manner as that in vessel 13 and, therefore, it is not believed necessary to describe again the operation of this structure.

FIGURE 7 is a modification of FIGURE 6.

Figure 9:
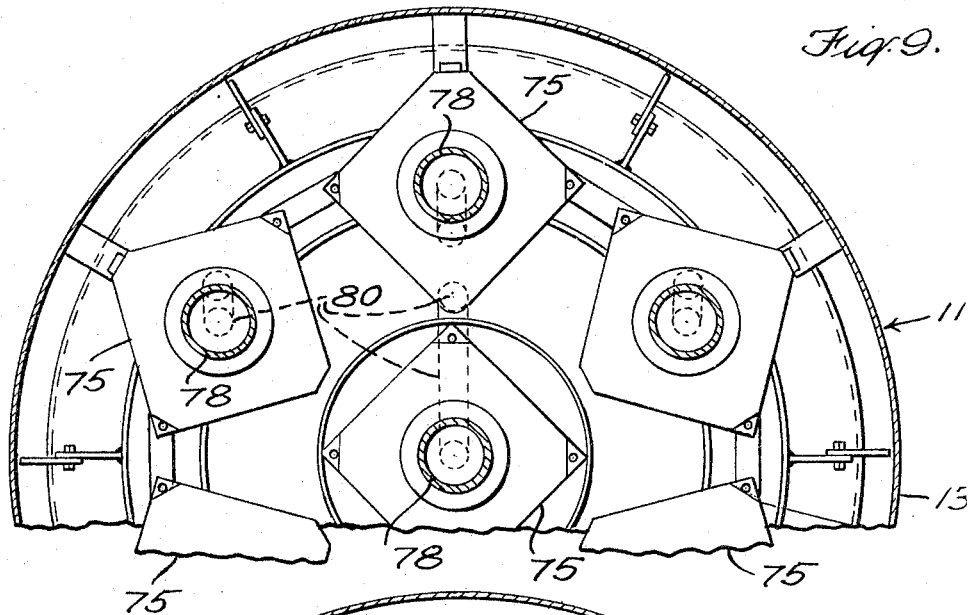
FIGURE 9 is a partial sectional view taken along line 9—9 of FIGURE 8.
Figure 10:
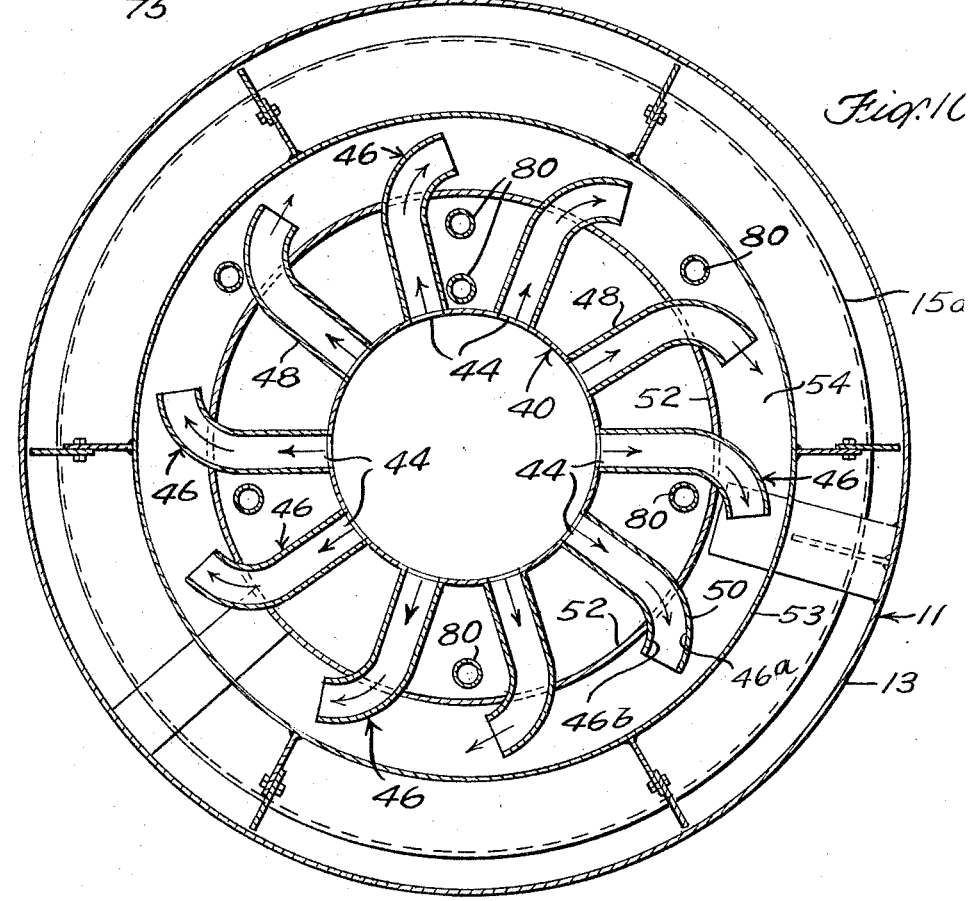
FIGURE 10 is an enlarged sectional view taken along line 10—10 of FIGURE 8.

FIGURES 8 through 10 inclusive depict another embodiment of the vapor-liquid separating apparatus. A novel feature of this embodiment is the open top for the baffle 53. The top edge of the baffle is preferably at least as high as the highest point of the conduits 46. However, the baffle 53 must be also kept low enough to permit the separated steam to readily flow over it. Should liquid spill over the baffle 53, it is obvious from FIGURE 8 that it will drop downward when over the space between the wall 13 and the baffle 53 since there is no upward pressure from this space. Also, liquid which should flow over the baffle 53 will strike wall 13 unless it drops downward first. Upon contact with the wall 13, the liquid will flow downward just as when it strikes the baffle 53.

It will be understood by those skilled in the steam generator art that changes may be made in the disclosed embodiments without departing from the scope of the invention as defined in the claims.

What is claimed is:

1. An apparatus for separating a mixture of liquid and vapor flowing from a vapor generator, said vapor-liquid mixture containing a majority by weight of liquid, comprising:

a vertical cylindrical outer housing having an open lower end for association with a vapor generator said housing having a closed upper end defining a vapor discharge port;

a vertical cylindrical collection member having an open lower end for association with a vapor generator for receiving a flow of vapor-liquid mixture and a closed upper end, said vertical cylindrical collection member defining a series of evenly-spaced rectangular slots about the periphery of said vertical cylindrical collection member adjacent said upper end;

a plurality of radially disposed horizontal conduits with rectangular cross-sections, each radially disposed horizontal conduit in communication with one of said slots and having an arcuate end defining a discharge opening, the outer ends of said radially disposed horizontal conduits forming a concentric circle about said vertical cylindrical collection member;

a vertical cylindrial outer baffle concentrically located within said vertical cylindrical outer housing and closely spaced about the outer ends of said plurality of radially disposed horizontal conduits, said vertical cylindrical outer baffle having a vapor discharge means in the upper portion thereof and extending from at least the uppermost edge of said plurality of radially disposed horizontal conduits along a substantially major portion of said vertical cylindrical collection member;

a series of downwardly sloping vanes located in each of said discharge openings whereby said vapor-liquid mixture is discharged downwardly and tangentially onto said vertical cylindrical outer baffle thereby imparting a centrifugal motion which separates a substantial part of the liquid from the vapor;

a vertical cylindrical inner baffle concentrically located about said vertical cylindrical collection member and within said vertical cylindrical outer baffle, said vertical cylindrical inner baffle extending from the lower edge of said plurality of radially disposed horizontal conduits along a major portion of said vertical cylindrical collection member, said vertical cylindrical inner baffle forming a concentric circle about said collection member smaller than the concentric circle formed by said radially disposed horizontal conduits, said vertical cylindrical outer baffle and said vertical cylindrical inner baffle forming an annular vapor-liquid separation chamber;

filtering means including a cylindrically shaped wire-mesh filter for additionally filtering out remaining liquid and drying the vapor, said cylindrically shaped wire-mesh filter being located directly above said plurality of radially disposed horizontal conduits, said discharge port being located above said filtering means so that the vapor passes through the following means; and a plurality of vertically oriented pipes extending downwardly from said filtering means below said plurality of radially disposed horizontal conduits between said vertical cylindrical inner baffle and said vertical cylindrical collection number.

2. An apparatus according to claim 1 wherein said filtering means further includes a plurality of chevron-type dryers located above said cylindrically shaped wire-mesh filter, a horizontal plate being located between said cylindrically shaped wire-mesh filter and said plurality of chevron-type dryers to cause the vapor to change its direction of flow whereby still additional liquid is separated from said vapor.

References Cited by the Examiner

UNITED STATES PATENTS

| | | | |
|---|---|---|---|
| 677,358 | 7/1901 | Hyde | 55—458 |
| 2,560,077 | 7/1951 | Bloomer et al. | 261—114 X |
| 2,759,559 | 8/1956 | Bourne | 55—459 X |
| 2,862,479 | 12/1958 | Blaser et al. | 122—491 X |
| 2,970,671 | 2/1961 | Warmer | 55—327 |
| 3,139,070 | 6/1964 | Sprague et al. | 122—34 |

FOREIGN PATENTS 12,740　8/1940　Great Britain.

ROBERT F. BURNETT, *Primary Examiner.*

D. K. DENENBERG, *Assistant Examiner.*